United States Patent
Finn

(10) Patent No.: US 9,143,353 B2
(45) Date of Patent: *Sep. 22, 2015

(54) STREAM RESERVATION PROTOCOL FOR BRIDGED NETWORKS

(75) Inventor: Norman W. Finn, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 346 days.

This patent is subject to a terminal disclaimer.

(21) Appl. No.: 13/270,901

(22) Filed: Oct. 11, 2011

(65) Prior Publication Data

US 2012/0036267 A1 Feb. 9, 2012

Related U.S. Application Data

(63) Continuation of application No. 12/192,474, filed on Aug. 15, 2008, now Pat. No. 8,060,615.

(60) Provisional application No. 60/956,049, filed on Aug. 15, 2007.

(51) Int. Cl.
*G06F 15/16* (2006.01)
*H04L 12/54* (2013.01)
*H04L 12/46* (2006.01)
*H04L 12/913* (2013.01)

(52) U.S. Cl.
CPC .......... *H04L 12/5695* (2013.01); *H04L 12/462* (2013.01); *H04L 47/724* (2013.01)

(58) Field of Classification Search
USPC .................................. 709/204, 226, 230–235
See application file for complete search history.

(56) References Cited

U.S. PATENT DOCUMENTS

| 6,219,699 | B1 | 4/2001 | McCloghrie et al. |
| 6,631,415 | B1 * | 10/2003 | James et al. ................. 709/227 |
| 6,813,250 | B1 | 11/2004 | Fine et al. |
| 6,934,262 | B1 | 8/2005 | Lau et al. |
| 6,937,576 | B1 | 8/2005 | De Benedetto et al. |

(Continued)

FOREIGN PATENT DOCUMENTS

WO WO-03/045010 A2 5/2003

OTHER PUBLICATIONS

"Open Systems Interconnect (OSI)," downloaded from <http://www.comtest.com/tutorials/osi.html>. Dec. 11, 2000.*

(Continued)

*Primary Examiner* — Scott B Christensen
(74) *Attorney, Agent, or Firm* — Novak Druce Connolly Bove + Quigg LLP

(57) ABSTRACT

In one embodiment, a Talker device issues a Talker declaration for a stream. The Talker declaration has a declaration type that advertises the Talker device is offering the stream, and includes a stream ID that uniquely identifies the stream, an indication of resource requirements of the stream, and an indication of a priority of data frames belonging to the stream. The Talker device receives a Listener Declaration from a Listener device of one or more Listener devices. The Listener declaration includes the same stream ID as the Talker declaration and has a declaration type that indicates at least one Listener device is ready to receive the stream and that sufficient resources to meet the resource requirements of the stream have been allocated at one or more intervening bridges that received both the Talker declaration and the Listener declaration. In response the received Listener declaration, transmission of the stream is begun.

28 Claims, 21 Drawing Sheets

(56) References Cited

U.S. PATENT DOCUMENTS

| | | | |
|---|---|---|---|
| 7,002,917 | B1 | 2/2006 | Saleh |
| 7,185,073 | B1 | 2/2007 | Gai et al. |
| 7,246,373 | B1 | 7/2007 | Leung et al. |
| 7,272,651 | B1 | 9/2007 | Bolding et al. |
| 7,376,827 | B1 | 5/2008 | Jiao |
| 7,574,550 | B2 * | 8/2009 | Feng ............................ 710/311 |
| 2006/0073826 | A1 | 4/2006 | Miernik |
| 2006/0093115 | A1 | 5/2006 | Chen et al. |
| 2006/0171337 | A1 | 8/2006 | Shaffer et al. |
| 2006/0218301 | A1 | 9/2006 | O'Toole et al. |
| 2006/0268903 | A1 | 11/2006 | Feng |
| 2007/0110024 | A1 | 5/2007 | Meier |
| 2007/0116014 | A1 | 5/2007 | Shuen et al. |
| 2007/0180483 | A1 | 8/2007 | Popoviciu et al. |
| 2008/0235699 | A1 * | 9/2008 | Jeong et al. .................. 718/104 |

OTHER PUBLICATIONS

Braden, R., et al., "Resource ReSerVation Protocol (RSVP)—Version 1 Functional Specification," Network Working Group, Request for Comments 2205, Sep. 1997, IETF, http://www.ietf.org/rfc/rfc2205.txt?number=2205, 105 pages.

Feng, Feifei et al., "End-to-end Stream Establishment in Consumer Home Networks," Consumer Communications and Networking Conference, 2006. CCNC 2006. 20 06 $3^{rd}$ IEEE Las Vegas, NV, USA Jan. 8-10, 2006, Piscataway, NJ, USA, IEEE, vol. 2, Jan. 8, 2006, pp. 888-891.

Herzog, S., "RSVP Extensions for Policy Control," Network Working Group, Request for Comments 2750, Jan. 2000, IETF, http://www.ietf.org/rfc/rfc2750.txt?number=2750, 13 pages.

PCT Notification of Transmittal of the International Search Report and the Written Opinion of the International Searching Authority, or the Declaration, International Application No. PCT/US08/73329, International Filing Date: Aug. 15, 2008, Date of Mailing Nov. 7, 2008, 8 pages.

Supplementary European Search Report, European Application No.: 08797987.8-1249 / 2179367, PCT/US2008073329, Applicant: Cisco Technology, Inc., Date of Mailing: Nov. 5, 2010, pp. 1-6.

U.S. Appl. No. 60/956,049, entitled Stream Reservation Protocol for Bridged Networks, filed by Norman Finn on Aug. 15, 2007, 92 pages.

\* cited by examiner

| SHOULD THIS HAPPEN? | | | Y | Y | N | N | N | N | N | Y | Y | Y | N | N | N | N | N | N | N | N | N | N | N | N | N | N | N | N | N | N |
|---|---|---|---|---|---|---|---|---|---|---|---|---|---|---|---|---|---|---|---|---|---|---|---|---|---|---|---|---|---|---|
| REGISTRATION FROM | T | TALKER | - | - | - | - | - | - | - | - | - | - | - | - | - | - | - | - | - | - | - | - | - | - | - | - | - | - | - | - |
| | L1 | LISTENER | - | - | - | - | - | - | - | A | A | A | A | A | R | R | R | R | Af | Af | Af | Rf | Rf | Rf | Rf | Rf | Rf | Rf | Rf | Rf |
| | L2 | LISTENER | A | R | Af | Rf | - | - | - | - | A | R | Af | Rf | - | A | R | Af | - | A | R | Af | - | A | R | Af | - | A | R | Af |
| DECLARATION TO | T | LISTENER | A | A | A | A | A | A | A | A | A | A | A | A | A | A | A | A | A | A | A | A | A | A | A | A | A | A | A | A |
| | L1 | LISTENER | - | - | - | - | - | - | A | - | A | A | A | A | A | A | A | A | A | A | A | A | - | A | - | A | - | - | A | - |
| | L2 | LISTENER | A | A | A | A | - | A | - | A | A | A | A | A | A | A | A | A | A | A | A | A | A | A | A | A | A | A | A | A |
| | X | LISTENER | - | A | A | A | A | A | A | A | A | A | A | A | A | A | A | A | A | A | A | A | A | A | A | A | A | A | A | A |

| | | | | | | | | | | | | | | |
|---|---|---|---|---|---|---|---|---|---|---|---|---|---|---|
| REGISTRATION FROM | T | TALKER | O | O | O | O | O | O | O | O | O | O | O | |
| | L1 | LISTENER CONFIG.? | Af | Af | Af | Af | Af | Rf | Rf | Rf | Rf | Rf | Rf | |
| | | | | | | | | N | Y | N | Y | N | Y | N | Y |
| | L2 | LISTENER CONFIG.? | - | A | R | Af | Rf | - | A | R | Af | R | Af | |
| | | | | | N | Y | N | Y | | | N | Y | | N | Y | N | Y |
| DECLARATION TO | T | LISTENER | Af | Af | Af | Rf | Af | Rf | Rf | Af | Rf | Rf | Af | Rf | Rf |
| | L1 | LISTENER | - | A | A | A | A | A | - | A | A | A | A | A | A |
| | L2 | LISTENER | A | A | A | A | A | A | A | A | A | A | A | A | A |
| | X | LISTENER | A | A | A | A | A | A | A | A | A | A | A | A | A |

| SHOULD THIS HAPPEN? | Y | Y | N | N | N | Y | Y | Y | Y | Y | Y | Y | Y | Y | Y |
|---|---|---|---|---|---|---|---|---|---|---|---|---|---|---|---|
| DECLARATION TO (FROM ABOVE) T | ANY (OR NONE) | | | | | | | | | NONE, A, R, OR Rf (ANY EXCEPT Af) | | | | | Af |
| LISTENER (A, R, Rf, Af) T | - | - | - | - | - | F | F | F | F | O | O | O | O | O | O |
| REGISTRATION FROM — LISTENER (A, R, Rf, Af) L | - | A | R | Af | Rf | - | A | R | Af | Rf | - | A | R | Af | Rf |
| SUFFICIENT BW AVAILABLE TO PASS THIS STREAM L | - | - | - | - | - | N | Y | N | Y | N | Y | N | Y | N | Y |
| DECLARATION TO L | F | F | F | F | F | F | O | F | O | F | O | F | O | F | O |

STREAM RESERVATION PROTOCOL FOR BRIDGED NETWORKS

RELATED APPLICATION

This application is a continuation of U.S. application Ser. No. 12/192,474, entitled STREAM RESERVATION PROTOCOL FOR BRIDGED NETWORKS, filed by Norman Finn on Aug. 15, 2008, the contents of which are hereby incorporated in their entirety. U.S. application Ser. No. 12/192,474 claims the benefit of U.S. Provisional Application Ser. No. 60/956,049, entitled STREAM RESERVATION PROTOCOL FOR BRIDGED NETWORKS, filed by Norman Finn on Aug. 15, 2007, the contents of which are hereby incorporated in their entirety.

TECHNICAL FIELD

The present disclosure relates generally to computer networks, and, more particularly, to resource allocation for data streams in bridged computer networks.

BACKGROUND

Data in computer networks is often transmitted as a flow or stream of data (a "data stream" or simply "stream") from a source device to one more destination devices (or "sinks"). In many cases, the source device is aware of resources that may be required by the stream, such as a general maximum amount of bandwidth (e.g., in megabytes per second or "MBps"), which if the stream is not irregular, may be substantially used most of the time the stream is being transmitted. Congestion may occur in a network when there is more traffic (data) traversing network devices than those devices can handle. For instance, due to "fan-in," where multiple input ports of a device receive traffic destined out a same single port of the device, that single port may have to drop or otherwise shape traffic. For example, if a device has twenty-five ports that can support 100 MBps, and twenty-four of those ports receive 5 MBps of traffic to be transmitted out the twenty-fifth port at the same time, the twenty-fifth port has insufficient resources for the traffic flows of all twenty-four incoming ports (i.e., 5 MBps time twenty-four is 120 MBps, 20 MBps more than the twenty-fifth port can sustain).

Various protocols are in place today that allow network devices to reserve or allocate network resources (e.g., bandwidth) for a data stream along a path. For instance, the Resource reSerVation Protocol (RSVP) is one known protocol (e.g., IETF RFCs 2205 and 2750) that operates on Layer-3 devices (e.g., routers) that may be used to reserve bandwidth along a path (Layer-3 being in accordance with the known Open Systems Interconnection (OSI) Reference Model). For example, if one router has ports capable of supporting 100 MBps, a first stream requesting 60 MBps will be allowed to reserve 60 MBps of the 100 MBps on that port, thus ensuring that the stream has sufficient bandwidth. If another stream attempts to reserve 60 MBps on that same port, RSVP will reject the reservation attempt, since only 40 MBps remain unallocated on that port.

As noted, however, RSVP operates on Layer-3 devices, e.g., routers. Layer-2 networks with Layer-2 devices (e.g., bridges/switches, thus "bridged networks") on the other hand, do not operate according to Layer-3 protocols, and thus cannot use RSVP. In addition, due to certain differences between Layer-2 and Layer-3 operation, RSVP may be ill-suited for use in Layer-2, not having been designed based on the operating procedures and implementation functionality of Layer-2.

BRIEF DESCRIPTION OF THE DRAWINGS

The advantages of the invention may be better understood by referring to the following description in conjunction with the accompanying drawings in which like reference numerals indicate identically or functionally similar elements, of which:

FIGS. 10A-10G illustrate example tables showing operational relationships of stream reservation registration messages on bridge ports.

DESCRIPTION OF EXAMPLE EMBODIMENTS

Overview

Figure 1:
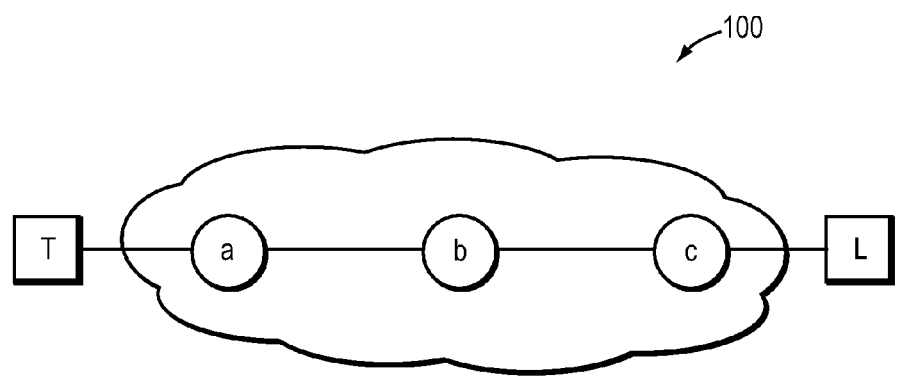
FIG. 1 illustrates an example computer network (e.g., a bridged network)

According to embodiments of the disclosure, a talker device may issue talker registrations to bridges of a network domain for a stream, the talker registration having at least a bandwidth requirement and a state of the talker registration as either offering or failed. Also, a listener device may issue listener registrations for a stream, the listener registration having at least a state of the listener registration as one of asking, asking-failed, ready, or ready-failed. In response to receiving a talker registration and listener registration for the same stream, a bridge of the network domain may then attempt to allocate resources for the stream if the bridge is on a path of the stream between the talker device and the listener device. The bridge may then notify, via respective states of the talker and listener registrations, the talker device and the listener device of whether resources have been allocated for the stream. For example, then, in response to receiving a listener registration in one of either a ready or ready-failed state, the talker device may initiate transmission of the stream, accordingly.

Description

A computer network typically comprises a plurality of interconnected entities. An entity may consist of any network device, such as a server or end station, that "sources" (i.e., transmits) or "sinks" (i.e., receives) data frames. A common type of computer network is a local area network ("LAN") which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack).

One or more intermediate network devices are often used to couple LANs together and allow the corresponding entities to exchange information. For example, a bridge may be used to provide a "bridging" function between two or more LANs.

Typically, the bridge is a computer and includes a plurality of ports that are coupled to the LANs. Ports that are coupled to LANs that are, in turn, coupled to other Bridges are generally referred to as a trunk ports, whereas ports used to couple bridges through LANs to end stations are generally referred to as access ports. The bridging function includes receiving data from a sending entity at a source port and transferring that data to at least one destination port for forwarding to a receiving entity.

Although bridges may operate at various levels of the communication protocol stack, they typically operate at Layer-2 which, in the OSI Reference Model, is called the data link layer and includes the Logical Link Control (LLC) and Media Access Control (MAC) sub-layers. Data frames at the data link layer typically include a header containing the MAC address of the entity sourcing the message, referred to as the source address, and the MAC address of the entity to which the message is being sent, referred to as the destination address. To perform the bridging function, Layer-2 bridges examine the MAC destination address of each data frame received on a source port. The frame is then switched onto the destination port(s) associated with that MAC destination address.

Other devices, commonly referred to as routers, may operate at higher communication layers, such as Layer-3 of the OSI Reference Model, which in Transmission Control Protocol/Internet Protocol (TCP/IP) networks corresponds to the Internet Protocol (IP) layer. Packets at the IP layer also include a header which contains an IP source address and an IP destination address. Routers or Layer-3 switches may reassemble or convert received data frames from one LAN standard (e.g., Ethernet) to another (e.g. token ring). Thus, Layer-3 devices are often used to interconnect dissimilar subnetworks.

FIG. 1 is a schematic block diagram of an example computer network 100 illustratively comprising nodes/devices, such as bridges "a-c" and two or more stations (e.g., a "talker" T and a "listener" L), interconnected by four LANs, as shown. Since network 100 comprises bridges, and illustratively operates according to Layer-2, the network 100 may be referred to herein as a "bridged network" accordingly. Those skilled in the art will understand that any number of nodes, devices, links, etc. may be used in the computer network, and that the view shown herein is for simplicity. For example, while the network 100 of bridges is shown as a simple segment of a small number of bridges, the embodiments described herein may also be applicable to "chains" or "rings" of bridges, e.g., large numbers of bridges. Those skilled in the art will also understand that while the embodiments described herein are described generally, they may apply to any network. The computer (bridged) network 100 of FIG. 1 is meant for illustration purposes only and is not meant to limit the embodiments described herein. Also, where a bridge is specifically configured for audio and video (AV) use, such a bridge may be referred to as an "AV Bridge" accordingly.

Figure 2:
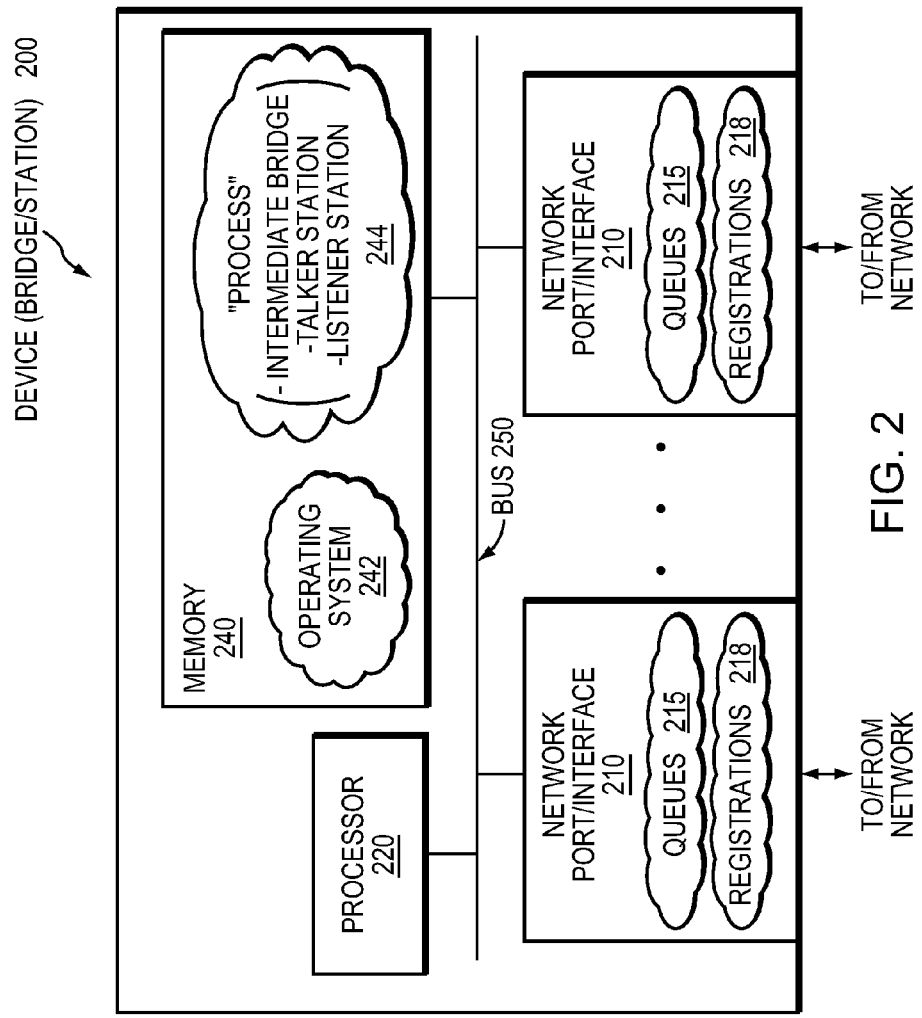
FIG. 2 illustrates an example network device/node (e.g., bridge)

FIG. 2 is a schematic block diagram of an example node/device 200 that may be advantageously used with one or more embodiments described herein, e.g., as a bridge or station. The device comprises a plurality of network interfaces or ports 210, one or more processors 220, and a memory 240 interconnected by a system bus 250. The network interfaces/ports 210 contain the mechanical, electrical, and signaling circuitry for communicating data over physical links coupled to the network 100, particularly on Layer-2. The network interfaces/ports may be configured to transmit and/or receive data (frames) using a variety of different communication protocols over physical links or wireless links, for instance with the use of queues 215 as will be understood by those skilled in the art. For example, such communication protocols may include, inter alia, TCP/IP, UDP, ATM, synchronous optical networks (SONET), wireless protocols (e.g., IEEE Std. 802.11), Frame Relay, Ethernet (e.g., IEEE Std. 802.3), Fiber Distributed Data Interface (FDDI), etc. Notably, a network interface/port 210 may also be used to implement one or more virtual network interfaces, such as for Virtual Private Network (VPN) access or Virtual LANs (VLANs), as will be understood by those skilled in the art. Illustratively, the handling of frames within the network interfaces/ports 210 may conform to a protocol stack (not shown) that defines the functions performed by the data link and physical layers of a communications architecture.

The memory 240 comprises a plurality of storage locations that are addressable by the processor(s) 220 and the network interfaces/ports 210 for storing software programs and data structures associated with the embodiments described herein. The processors 220 may comprise necessary elements or logic adapted to execute the software programs and manipulate the data structures. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise an illustratively simplified "process" 244 (e.g., an "intermediate bridge process" or "bridge process" for bridges, and for stations, "talker process" or "listener process" accordingly). It will be apparent to those skilled in the art that other types of processors and memory, including various computer-readable media, may be used to store and execute program instructions pertaining to the inventive technique described herein.

Bridge process 244 (for bridges, e.g., a-c) contain computer executable instructions executed by the processors 220 to perform various functions relating to bridges in general, as may be appreciated by those skilled in the art, and in accordance with the novel techniques described herein. For instance, a communication process/service of bridge process 244 may perform functions provided by one or more communication protocols, such as various switching/bridging protocols. These functions may be configured to manage switching databases (e.g., spanning tree instances), filtering databases (FDBs), or forwarding information databases (FIBs) containing, e.g., data used to make switching/forwarding decisions. In particular, as part of communication process/services, a spanning tree process may execute to perform functions provided by one or more spanning tree protocols (STPs), such as the known Rapid STP (RSTP) and/or Multiple STP (MST), in addition to the novel techniques described herein. Illustratively, RSTP and MST may be employed on the network devices (bridges) to establish and maintain one or more spanning tree instances, converging the network in response to topology changes.

As noted, data in computer networks is often transmitted as a flow or stream of data from a source device, e.g., a Talker, to one more destination devices (or "sinks"), e.g., a Listener. In many cases, the Talker (source device) is aware of resources that may be required by the stream, such as a general maximum amount of bandwidth. Congestion may occur in a network, however, when there is more traffic (data) traversing network devices than those devices can handle. Various protocols are in place today that allow network devices to reserve or allocate network resources (e.g., bandwidth) for a data stream along a path. For instance, RSVP, a well-known protocol, operates on Layer-3 devices (e.g., routers) to provide for reservation services among those Layer-3 devices. Layer-2 networks, however, with Layer-2 devices (e.g., bridges/switches, thus "bridged networks"), do not operate according to Layer-3 protocols, and thus cannot use RSVP. In addition, due to certain differences between Layer-2 and Layer-3 operation, RSVP may be ill-suited for use in Layer-2, not having been designed based on the operating procedures and implementation functionality of Layer-2. (Notably, a further discussion regarding the differences between RSVP and the techniques described herein may be found below.)

Stream Reservation Protocol for Bridged Networks

According to embodiments of the disclosure, a talker device may issue talker registrations to bridges of a network domain for a stream, the talker registration having at least a bandwidth requirement and a state of the talker registration as either offering or failed. Also, a listener device may issue listener registrations for a stream, the listener registration having at least a state of the listener registration as one of asking, asking-failed, ready, or ready-failed. In response to receiving a talker registration and listener registration for the same stream, a bridge of the network domain may then attempt to allocate resources for the stream if the bridge is on a path of the stream between the talker device and the listener device. The bridge may then notify, via respective states of the talker and listener registrations, the talker device and the listener device of whether resources have been allocated for the stream. For example, then, in response to receiving a listener registration in one of either a ready or read-failed state, the talker device may initiate transmission of the stream, accordingly.

Illustratively, the techniques described herein may be performed by hardware, software, and/or firmware, such as in accordance with a general "process" 244, for example, an intermediate bridge process, Talker process, or Listener process, depending upon which device is executing the process. These respective processes (and/or services) may be configured to operate in accordance with certain conventional protocols, and in accordance with the techniques described herein (e.g., new protocols).

Preliminarily, IEEE Std. 802.1ak-2007, the Multiple Registration Protocol (MRP), is a robust, efficient protocol for declaring attributes to be registered in a database (registrations 218) in each port 210 of each bridge (optionally, station) 200 in a bridged network. For example, two applications have been defined that are based on MRP. The first, MVRP (Multicast VLAN Registration Protocol) registers VLAN ID attributes. That is, stations or configured bridge ports make (withdraw) declarations if they do (not) need to receive frames for a given VLAN ID. If a VLAN ID is registered on a bridge port by MVRP, the Bridge knows that that frames for that VLAN ID should be transmitted on that bridge port. In the second application, MMRP (Multiple Multicast Registration Protocol), the registered attribute is a MAC address, often a multicast address. Stations or configured bridge ports according to MMRP make (withdraw) declarations if they do (not) need to receive frames for a given address. Again, if an address is registered on a bridge port by MMRP, the bridge knows that that frames for that address should be transmitted on that bridge port.

According to the techniques described herein, two new protocols are defined: the Multiple Payload Registration Protocol (MPRP), a variant of MRP, with added capability that can server as the basis on which new applications can be built, and one such application/protocol, the Multiple Stream Reservation Protocol (MSRP), e.g., based on MPRP.

(Illustratively, then, registered resource allocations and other lists created from the registrations described below may be correspondingly stored within registrations 218 on the ports 210, and/or within other memory 240 locations, not shown.)

MPRP differs from MRP in that MRP registers attributes (multicast MAC addresses in MMRP, and VLAN IDs in MVRP), while MPRP registers {key, payload} pairs. Specifically, MPRP introduces a "payload," through which several different registrants may offer registrations for a same key with a different payload, each {key, payload} defined by an associated application. In other words, MPRP illustratively separates the Attribute registered by MRP into a {key, payload} pair, and serves as the basis for a new class of applications. The payload is registered along with the key, and on a given port, there is at most one {key, payload} registration for a given key K. Each application may define rules for:

Registration: What {key K, payload R} is to be registered if a registration for {key K, payload P} exists (or not), and a declaration for {key K, payload Q} is made or withdrawn?

Propagation: What {key K, payload X} declaration is to be made or withdrawn on a bridge port, given the port's registrations (if any) for {key K, payload Y}, and the other bridge ports' registrations for key K?

Generally, the rules for propagating MPRP keys are similar to propagating MRP Attributes, i.e., registrations with the same key may be treated as if they were a single registration. The rules for propagating MPRP payloads may be arbitrarily defined by the associated application(s).

The second protocol, the Multiple Stream Reservation Protocol (MSRP), is intended to enable application programs or routers running in stations attached to a bridged network to reserve bandwidth or other resources for individual multicast or unicast data streams to be sent across the bridged network. MSRP is, for example, an MPRP application, and performs the stream reservation techniques described herein. In particular MSRP defines the contents of the MPRP keys and payloads, and defines the rules by which the payloads are manipulated (e.g., between Talkers and Listeners). According to MSRP, bridges may allocate resources for data streams, in the form of parameter settings (configurations) on the priority queues that control the selection of frames to be output on a given bridge port. This enables the bridged network to provide reasonable guarantees that frames belonging to a reserved stream will be delivered reliably, with little chance of being dropped due to congestion on one link. (Notably, this protocol is separate from "congestion management," which is generally concerned with using data plane feedback techniques to control streams of data in real time. Stream Reservation is concerned with reserving queuing resources ahead of time for streams with predictable characteristics, resources that would otherwise be controlled by management operations.) In addition, in this manner, one or more embodiments described herein make reservations using control protocols that run along the same spanning tree as the data.

MSRP is generally intended for use with AV bridges, but is compatible and interoperable with non-AV devices' existing multicast distribution mechanisms, simply without delivery guarantees or resource allocation. Also, as described below, MSRP is compatible (and different from) RSVP. Further, MSRP is configured to support multiple Talkers on the same stream, shared media LANs, unicast streams, and streams on duplicated destination addresses. For example, one embodiment of MSRP illustratively uses MMRP (or GMRP or IGMP) to indicate a Listener's need for streams, as well as an MRP/MPRP-based protocol for sending a Talker's stream reservations and for sending a Listener's response, which cooperate with the Talker's stream reservation to configure output queues and enable transmission of the stream, and notify the Talker(s) when the network is ready for the data stream.

As an introduction, the following steps describe the basic functionality of the stream reservation protocol described in more detail below:

Step 1 (optional): A Listener (e.g., L) may notify Talker(s) (e.g., T) that it wants to receive a stream (for example, using known protocols, such as IEEE 802.1D-2004 GMRP, IEEE 802.1ak-2007 MMRP, or IETF RFC 2236/2933/3376 IGMP).

Step 2: One or more Talkers can issue Talker Registrations 300b that notify one or more bridges (e.g., all) in the network of a) the stream ID 322; b) the Talker 323; c) the direction 321 in which the Talker lies; d) the bandwidth 332, priority 337, and other QoS characteristics of the flow 335; e) the state of the registration 331 (offering or failed); and f) the relative ranking 336 of this stream reservation compared to other stream reservations. (Note that this step may take place either before or after step 3.)

Step 3: The Listener (or the Bridge nearest the Listener) issues a Listener registration 300a for a stream. This registration includes a) a stream ID 322; b) the identity of the sender of the registration packet 323; c) the bandwidth 332 the Listener is prepared to receive; and d) the state 331 of the Listener registration (asking, asking-failed, ready, or ready-failed.)

Step 4: As the registrations defined in steps 2 and 3 cross, a bridge can know whether it is on the path of the stream, attempt to allocate resources for the stream if it is on the path, and signal, both upstream and downstream, whether the reservation was successful or not.

Step 5: When (e.g., and only when) the Talker receives a Listener registration in the ready or ready-failed state, it can start transmission of the data stream, and be substantially assured that the stream should have a low probability of packet loss.

As noted, there are four types of Listener declarations that can be made from an applicant port, e.g., for a stream "S" at bandwidth "W," to be delivered to that port:

asking: One or more Listeners want stream S through the applicant port, but no path to any Listener is known to be ready to receive it. Data cannot be sent.

asking-failed: One or more Listeners would like to receive stream S through the applicant port, at least one cannot, for lack of resources along the path, and no path to any Listener is known to be ready to receive it. Data cannot be sent.

ready: All known paths to Listeners are configured to receive stream S through the applicant port. Data can be sent.

ready-failed: At least one path to a Listener behind this applicant is "ready," and at least one is "asking-failed." Data can be sent.

Also, there are two types of Talker declarations that can be made from an applicant port, e.g., for sending stream "S," with rank "R," from Talker "T," requiring bandwidth "W," on VLAN ID "V," MAC address "M," and priority "P" to be sent from that port:

offering: Applicant port can be made ready to send stream S, if and when a ready or ready-failed Listener declaration has been registered on the port.

failed: Applicant port cannot be configured to send stream S, for lack of resources somewhere along the path from the Talker through the port.

Figure 3:
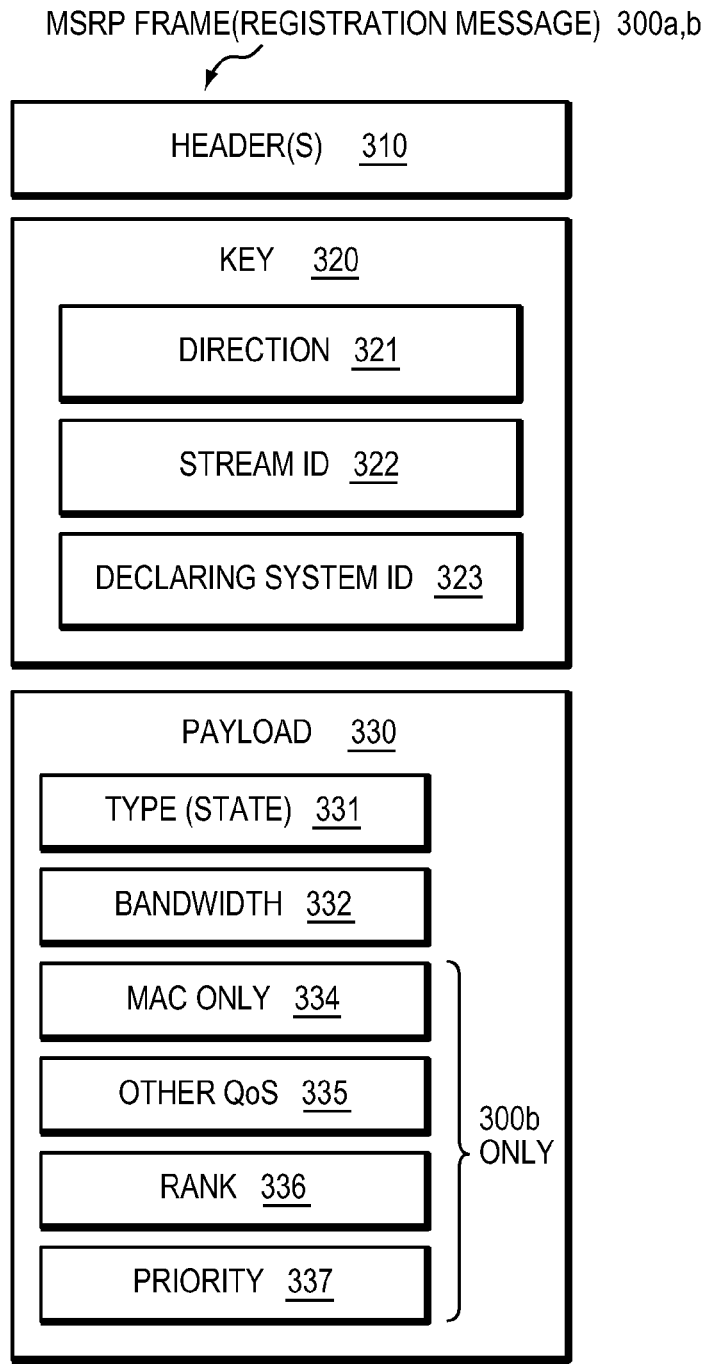
FIG. 3 illustrates an example stream reservation registration message.

These types may be carried in corresponding declarations or "talker/listener registrations," e.g., as shown in FIG. 3.

In particular, FIG. 3 illustrates an example registration message 300 that may be used in accordance with one or more embodiments described herein, such as for MSRP registrations from a Listener (300a) and a Talker (300b). As mentioned above, MSRP may be an application of the novel MPRP, which provides for a {key, payload} pair. As such, in addition to one or more headers 310, which may comprise various known information used to transmit the message 300 according to various transportation protocols (e.g., IP, ATM, MPLS, etc.), the message may comprise a key 320 and a payload 330.

The Listener declaration/registration 300a comprises a registration key 320 having one or more fields (populated with entries) corresponding to:

Direction 321: Listener.

Stream ID 322: Stream identifier "S" used to match Talker and Listener registrations. The stream ID includes the VLAN ID "V" and destination MAC address "M" of the stream's data frames (which can be unicast or multicast) and may include higher-layer ID information that is opaque to bridges.

Declaring system ID 323: Identifies the system making the declaration (e.g., the Listener or a bridge attached to the listener).

Also, the Listener declaration/registration 300a comprises a registration payload 330 having one or more fields (populated with entries) corresponding to:

Type 331: The state of the registration, either asking, ready, asking-failed, or ready-failed.

Bandwidth: Total bandwidth that the declaring port is prepared to receive. Illustratively should not be zero if the type is ready or ready-failed, and should be zero if the type is asking or asking-failed.

Further, a Talker declaration/registration 300b comprises a registration key 320 which carries the same fields of the Listener registration 300a, populated as:

Direction 321: Talker.

Stream ID 322: (Same information as 300a).

Declaring System (Talker) ID 323: Uniquely identifies the Talker "T" offering the stream.

The Talker declaration/registration 300b also comprises a registration payload 330 having one or more fields shared with Listener registration 300a, yet populated as:

Type 331: The state of the registration, either offering or failed.

Bandwidth: Maximum bandwidth of the stream to be transmitted by Talker T.

In addition to the fields used in Listener registrations 300a, Talker registrations 300b may also comprise further fields, as follows.

MAC only 334: An indication, e.g., a Boolean flag, signifying that the bridge cannot differentiate streams for forwarding purposes except by VLAN ID and destination MAC address.

Other QoS information 335: Other information that may be required to characterize the stream's requirements, e.g., a hop count or a delay.

Rank 336: Value used by bridges to resolve competition for bandwidth.

Priority 337: Priority value to be carried in data frames belonging to the stream.

As noted above, the Stream ID field 322 contains the VLAN ID and destination MAC address to be used by the data stream, and may also contain a higher-layer stream identification. For example, this information may be a facility available to the higher layers for implementing multiple streams on one destination MAC address. Also, the information could be used by a bridge to differentiate streams (where, e.g., a declaration with a higher-layer stream ID does not match a declaration with the same VLAN ID and MAC address, but without a higher-layer stream ID).

Moreover, when populating the bandwidth field 332, it is important to note that each link in a bridged network may have a different amount of overhead for an Ethernet payload byte. For example, 802.11 wireless media generally have more addresses and more interframe gap, than do 802.3 links. Also, some links may carry additional tags such as 802.1AE security headers. Therefore, the Talker and Listener may illustratively be configured to express bandwidth in terms of bytes per second required by the stream, and in terms of average Ethernet payload size. In this manner, each system, when comparing different streams' bandwidths, may be able to use its knowledge of the overhead of a given link to convert the bandwidth and payload size information into a bits-per-second bandwidth requirement, which may be used for simple integer comparisons.

MAC Only field/parameter 334 may be used by the Talker such that if two streams are offered that use the same VLAN and destination MAC address, but have different higher-layer stream IDs, certain bridges may be unable select whether to forward one stream, but not the other, through a given port (for example, bridges that implement no more than is specified in 802.1Q, which provides only the destination MAC address for making this decision). Accordingly, if the MAC Only parameter (indicator) is true, then the bridge sending the declaration signifies that it cannot differentiate streams by higher-layer stream IDs (i.e., instead only based on VLAN IDs or destination MAC addresses), and contrarily, if the MAC Only parameter is false, then the bridge can differentiate all streams for which there is a MAC address collision.

Other QoS information field 335 may comprise information that the Talker may require in addition to the bandwidth. For example, such information may comprise, inter alia, a maximum delay that data frames in the stream can endure or a maximum hop count (e.g., where each bridge decrements the corresponding values accordingly, such that if either goes negative, the bridge cannot accommodate the stream, and the Talker registration's Type becomes failed), a maximum Ethernet payload size to be used by the stream, etc.

Rank field 336 may be derived from higher-layer information, and is provided by the Talker station. Also, priority field 337 may be populated by the Talker station in a similar manner. For example, as may be appreciated by those skilled in the art, a bridge's queue 215 may be prioritized, such that "high" priority traffic is transmitted prior to "low" priority traffic. While priority field 337 may carry this priority value (e.g., all of a certain type of stream, such as data, voice, video, etc., receives a particular priority value), the rank field 336 may be used to carry an additional ranking which may differentiate or otherwise supersede priority values. For example, all voice data may be carried at a certain priority, but an emergency call may have a higher ranking, which may be used to preempt any lower ranked voice calls.

Notably, other fields may also be used, such as appending new fields or replacing existing fields. Further, not all of the fields mentioned above need be used in each registration message 300, and the view and description above are merely one representative example.

A more detailed description of the primary control flow demonstrates how stream reservation in accordance with one or more embodiments herein requires that the following two announcements be separate:
1.) Talker can supply stream S, and it has these characteristics;
2.) Bridges/Listeners have configured their queues to handle stream S, so transmission can begin.

Without this interlock, the source (Talker) can start transmission of the data stream before the network is configured to handle it, thus disrupting existing streams. In addition, as described below, the techniques described herein allow any of MMRP, GMRP, IGMP, or MSRP to be used as a precursor to the first announcement, and also add failure notification, so that failed flows do not needlessly occupy resources.

Figure 4A:
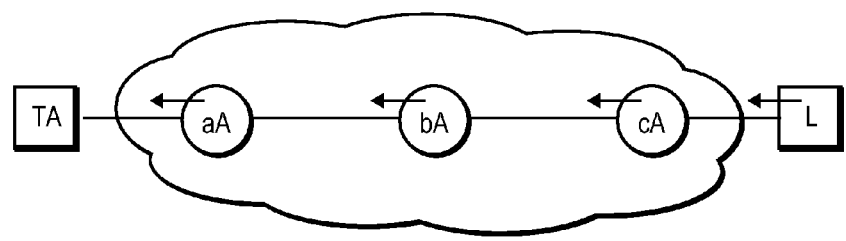
FIGS. 4A-9B illustrate example operations of stream reservation registration messages.

In particular, FIG. 4A illustrates an example (and optional) "asking" phase, where again network 100 of FIG. 1 comprises one Talker T, one Listener L, and three bridges a-c. As shown in FIG. 4A, Listener L sends an asking declaration (depicted as "A") that it wants a stream (e.g., "asks" for the stream from the talking device), illustratively in the form of a listener registration 300*a* having an asking state 331. Alternatively, this declaration may be an MMRP declaration, GMRP declaration, or a "snooped" IGMP declaration, as may be appreciated by those skilled in the art. The Talker T and the receiving bridges register the declaration.

Figure 4B:
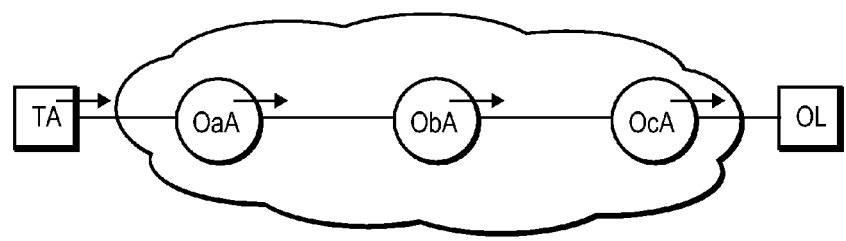

FIG. 4B illustrates an example "offering" phase, where the Talker T issues an offering declaration (depicted as "O") for a stream, illustratively embodied as talker registration 300*b* with an offering state 331. As mentioned herein, the offering declaration may comprise the ranking 336 of the reservation's importance, its required bandwidth 332, its Ethernet priority level 337, and destination MAC address (direction 321), and optionally, a higher-layer stream ID 322. The intermediate receiving bridges and any receiving listener (e.g., L) register the offer, which, as noted, may be declared/registered before, during, or after the Listener's asking (above) or ready (below) registrations.

Figure 4C:
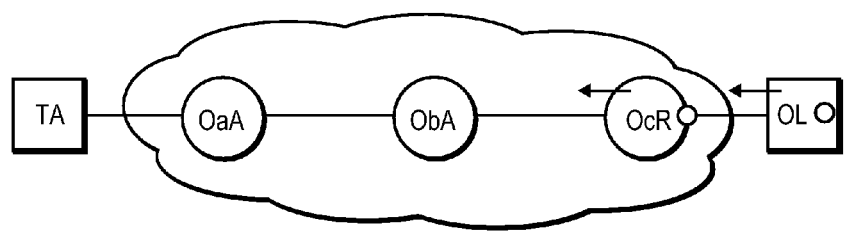

In FIG. 4C, an example ready declaration is illustrated, where once a Listener has configured itself to receive the stream, the Listener may issue a ready declaration (registration 300*a* with a ready state 331) (depicted as "R"). Once an intermediate bridge (e.g., bridge c) has registered both the offering and the ready declarations, it configures its output queues on that port (shown by the dot on the configured port), and propagates the ready declaration. Note that while bridge c is shown having "first" configured its port (e.g., in response), port configuration may occur regardless of the order in which the registrations are made, as it is the presence of an offering registration on an input port and a ready registration on an output port that triggers the bridge to configure the output port.

Figure 4D:
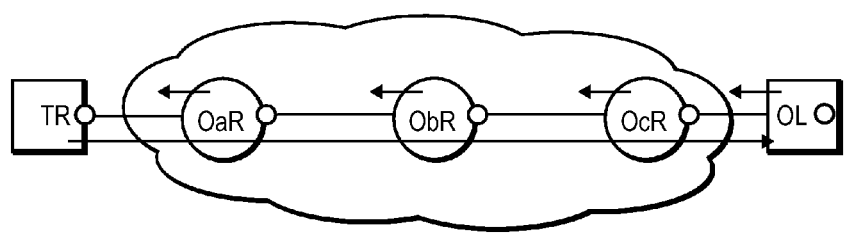

Lastly, in FIG. 4D, when the ready declaration has been registered in Talker T, it knows that the network is ready to receive the stream. Accordingly, Talker T may initiate transmission (i.e., start sending) the data stream (the large arrow from T to L). (Note that as described herein, each of the talker registrations and listener registrations may be transmitted in a packet/frame capable of transmitting a plurality of registrations, such as in accordance with MPRP.)

Having discussed the primary control flow of the stream reservation protocol described herein, FIGS. 5A-8C illustrate various situations in which one or more failures or collisions occur in the network 100, and how the protocol is configured to react thereto. For instance, FIGS. 5A-B illustrate an offering failure, where in FIG. 5A it is shown that again Talker T issues an offering declaration toward Listener L. If the link between bridge b and c has insufficient resources (e.g., insufficient bandwidth) to carry the flow/stream, then bridge b, having determined this, converts/changes the offering registration to a failed declaration (depicted as "F"). Listener L then becomes aware that the stream reservation has failed, and thus does not expect to receive the data.

Figure 5A:
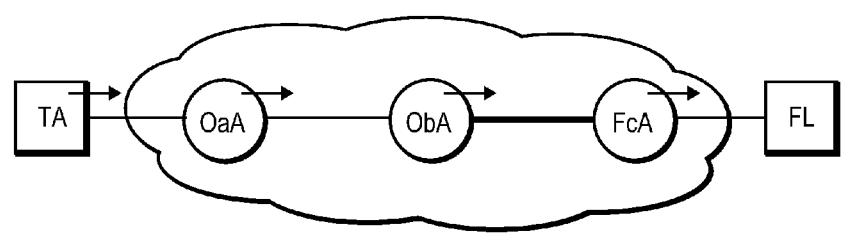
Figure 5B:
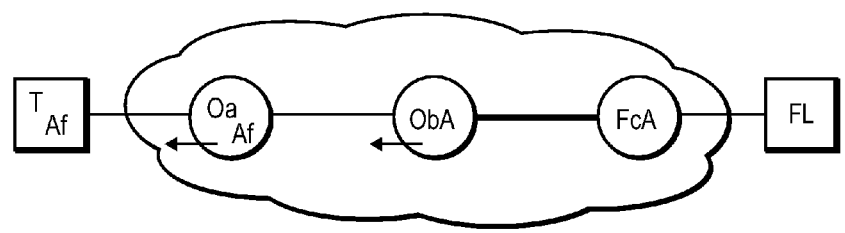

In addition, in FIG. 5B, bridge b also converts the asking registration to an asking failed declaration (depicted as "Af"). In this manner, all bridges of the network domain 100 know that the stream reservation has failed, so no resources (e.g., queues) are allocated/reserved for the stream, accordingly. Further, Talker T knows that the stream reservation has failed, and correspondingly may not send any data for the stream. (Note that a Talker may decide to send a stream without reservations, but at risk of the data being dropped or otherwise shaped.)

Figure 6A:
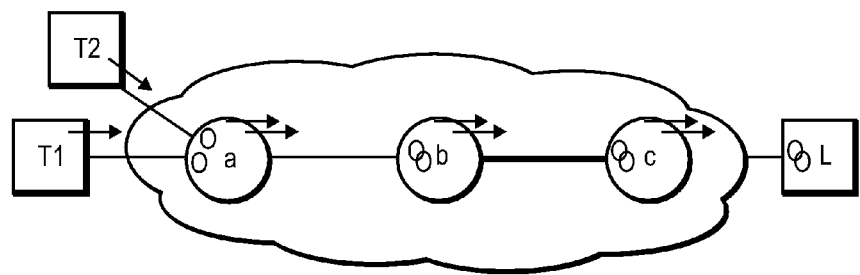
Figure 6B:
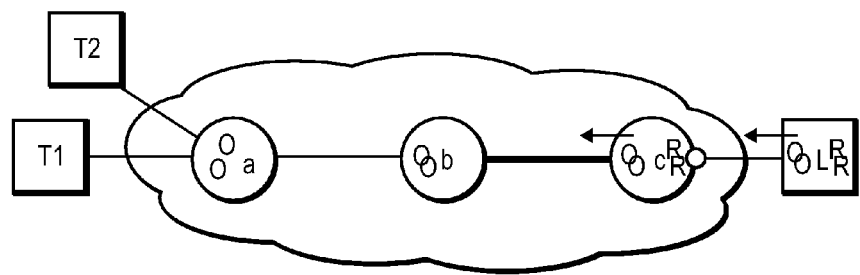

FIGS. 6A-D illustrate an example ready failure situation. Illustratively, in FIG. 6A no asking declarations have been made, yet. New Talkers T1 and T2 both issue offering declarations (registrations 300b, depicted as overlapping "O"s), and the link between bridges b and c can support only one of the two flows. Bridge b need not select which stream to refuse, because it does not know whether it is actually on the path for either stream; that is, it has not yet seen any asking or ready declarations. In FIG. 6B, however, when Listener L sends its ready declarations for the two offered streams (overlapping "R"s), Bridge c is able to configure its queues for both streams, but this is not so for Bridge b, since the bandwidth (or other resource) of the link is insufficient. Bridge b may then use the rankings 336 of the two stream reservations to decide which one to grant.

Figure 6C:
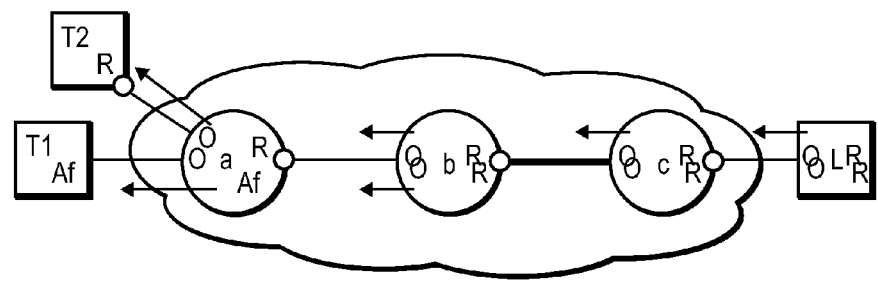
Figure 6D:
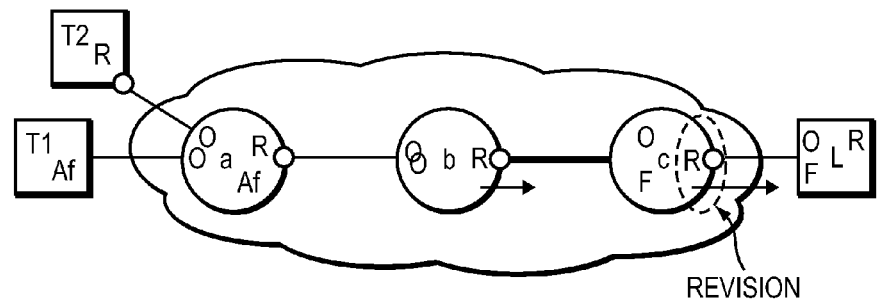

In FIG. 6C, assume that the stream from T2-L succeeds, and T1-L fails according to this decision. Accordingly, Bridge b sends the requisite declarations to tell the two Talkers what are the results of their reservations, specifically, it sends a ready declaration (registration in ready state) for the T2-L stream, and an asking failed declaration (registration in asking-failed state) for the T1-L stream. As shown in FIG. 6D, Bridge b also tells Listener L about the failure by updating the declaration for the T1-L stream to a failed status. Note that Bridge c may then be required to revise its queue configuration, as it originally configured the queue under the impression that both registrations were going to succeed. (Note further that this reconfiguration of the c-L port/link may cause a brief flap of some other stream(s), e.g., if the failed new stream is higher-ranking than some stream(s) already using the c-L port/link.)

Additionally, where multiple talkers (e.g., T1 and T2) are present, the key 320 of a Talker registration 300b comprises both the stream ID and the talker ID. This is because MSRP assumes that the Talkers are not coordinated with each other, so that their respective bandwidth requirements are additive. While registrations for Talkers on the same stream are propagated individually, multiple talker registrations, from different Talkers, can match a single Listener registration, all with the same stream ID. Thus, when computing outgoing Talker declarations on a port, the different Talkers' offering registrations' bandwidths are added together and compared to the Listener registration acceptable bandwidth. If the Talkers' bandwidth values add up to more than the Listener's acceptable bandwidth, then queue (or media load) configuration cannot support the least-important Talkers (e.g., based on rank/priority). For example, in a group conference mode, where all endpoints are sending and receiving to/from all other endpoints, it is possible for not all Talkers to be enabled.

Figure 7:
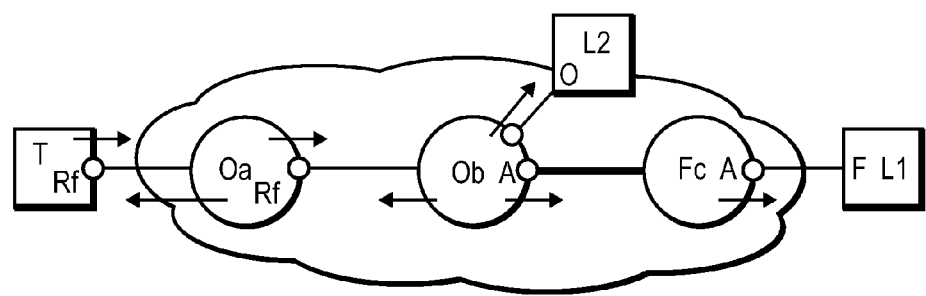

FIG. 7 briefly illustrates an example multipath failure, where a stream from Talker T to be registered toward two Listeners L1 and L2. Assuming that one path (T-L1) fails (i.e., at least one listener device is unable to receive the stream), and another path (TL2) succeeds, then Bridge b may return a ready failed declaration (a registration in the ready-failed state, e.g., a changed state) toward Talker T. Talker T then knows that it can send the stream (having received a Listener registration in ready-failed state), but that not all Listeners will receive it. Further, as described above, Listener L1 knows not to expect the data, and Listener L2 knows to expect it, respectively.

Notably, it can be seen that the stream reservation control flow builds a string of configured queues from the Listener(s) towards the Talker(s). In a worst case, three "passes" across the network are needed: "asking," "offering," and "ready." While it may be possible to build the string of configured queues from the Talker towards the Listener, thus requiring only two passes (e.g., "asking" and "granting"), there is one problem associated with this enhancement: determining when the Talker is able to initiate transmission of the stream. For instance, if the Talker starts sending the stream as soon as it receives an asking declaration, then it will transmit before Bridge a has configured its queues (that is, Bridge a cannot configure its queues before passing on the asking declaration, because it doesn't yet know where the Talker is; to do so would waste queue resources in Bridges that are not in the path of the stream.) This problem could be avoided if Bridge a configures its group filtering database (FDB) to discard the stream before it passes on the asking declaration, but then it would have to stop any existing flow using that same MAC address. This solution may make unicast stream reservation awkward, since all data flows would have to cease until the direction to the Talker was determined.

The techniques described above, on the other hand, allow an AV-capable Talker to supply a bandwidth-reserved stream to a non-AV-capable Listener. In particular, assume that the Listener issues a normal IGMP, MMRP, etc. to ask for the stream, and the Talker issues the offering Talker registration. The AV Bridge nearest the listener, knowing that the Listener is non-AV, can set up the queues. According to one or more embodiments described herein, then, non-bridge Listener stations need not be AV-capable.

Figure 8A:
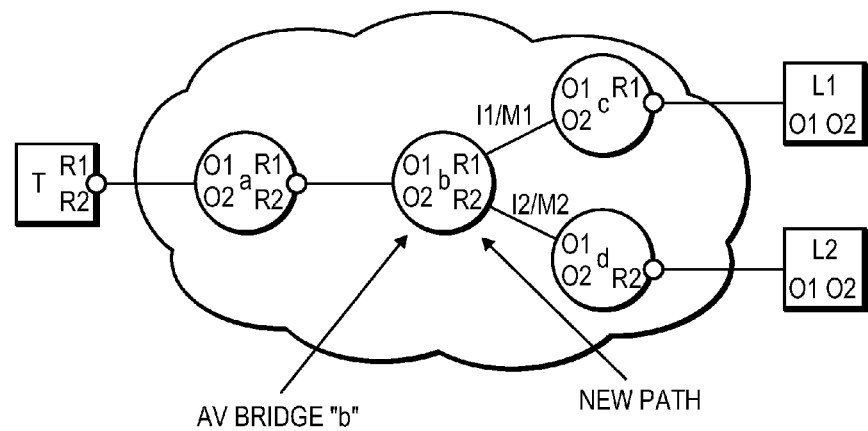
Figure 8B:
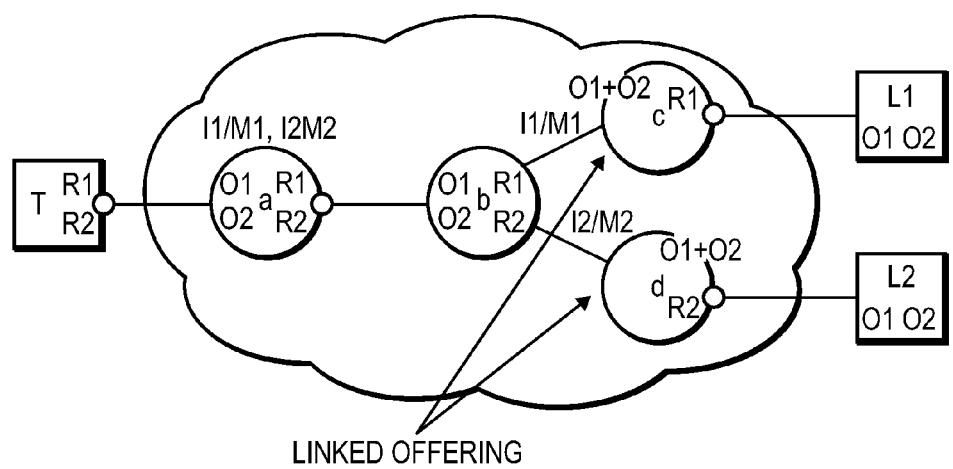
Figure 8C:
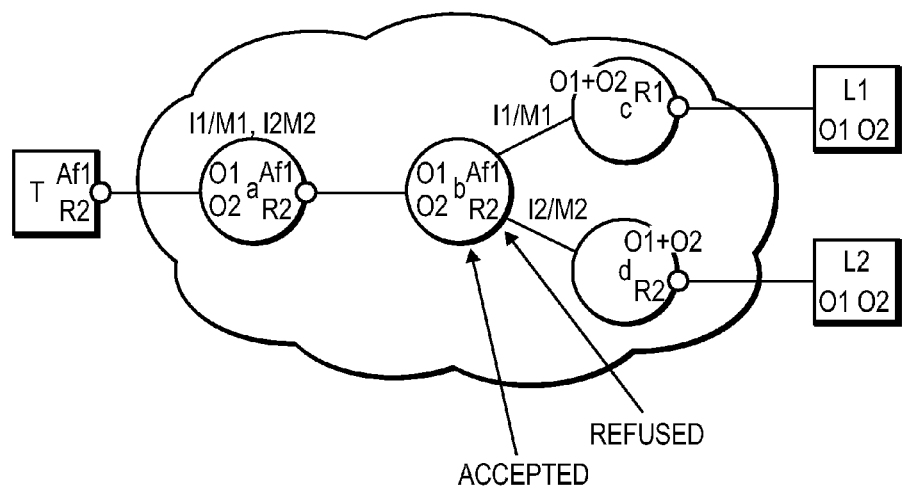

In addition to those failure scenarios mentioned above, other situations may also arise within the real-world application of the stream reservation protocol described herein. For instance, FIGS. 8A-8C illustrate "collisions," where the MAC addresses associated with two different streams are shared. For example, in FIG. 8A, assume that Talker T and Listener L1 have a path operating on IP multicast address "I1," and MAC address "M1" for a corresponding stream. Assume further that Talker T and Listener L2 want to create a new path for IP multicast address "I2," MAC address "M2" for a different stream. Although I1 is not the same as I2 (Layer-3 addresses), MAC addresses (Layer-2) M1 and M2 may be the same (as this can happen with IP). If, according to the example, Bridge b can direct frames based only on destination MAC address, it may either send both streams on any given port, or send neither.

As shown in FIG. 8B, therefore, Bridge b may link the two offering declarations together ("O1+O2"), thus indicating that if one of these streams is accepted, the bridge has to send both of them. This behavior is expected of a standard bridge, and because the destination MAC address is part of the declaration. This functionality may be reasonably accommodated by simply adding a "MAC only" parameter 334 (e.g., Boolean) indicating whether the bridge issuing the declaration can forward the data streams based on higher layer information, or must send all or nothing based on MAC addresses only. For example, as shown in FIG. 8C, assume further that Bridge c is also unable to differentiate the streams, and the c-L1 link/port has insufficient bandwidth to carry both streams of O1 and O2. As such, Bridge c must refuse the T-L1 stream. On the other hand, Bridge d may differentiate the streams, and thus can suppress the unwanted stream (e.g., T-L1), and accept the one it wants (e.g., T-L2).

Notably, it is possible to change stream bandwidth or additional QoS information according to embodiments described herein. For instance, if a stream's bandwidth must increase, the Talker may change the Talker registration's payload 330 (e.g., particularly field 332). That information is propagated down toward the Listeners, who respond by increasing the bandwidth in their Listener registrations. The revised Listener registrations 300a may then propagate back towards the Talker station, and the queues 215 of intermediate bridges may be reconfigured along the way back to the Talker. In this situation the Talker cannot send at the higher rate until the Listener registration bandwidth is at least as large as the bandwidth to be sent. (AS may be appreciated by those skilled in the art, this increased bandwidth may cause the stream to fail, as described above.) Alternatively, if a stream's bandwidth must decrease, the Talker station can simply transmit at the lower rate, and not change the registration. The Talker station should, however, reduce the bandwidth in its Talker registration. As this information is propagated towards the Listener stations, each Bridge along the way may adjust its transmission selection parameters to the new, lower value (which may cause other offered flows/streams to be registered successfully). In addition, other QoS changes may also be made in a similar manner. For instance, changes to the delay or hop count may be made and propagated by the Bridges, and may cause a stream to change it status, either to or from failed, accordingly.

Figure 9A:
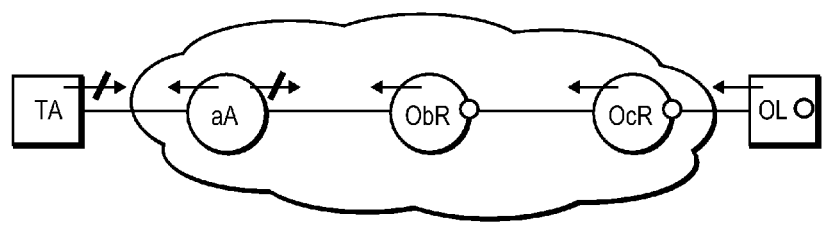
Figure 9B:
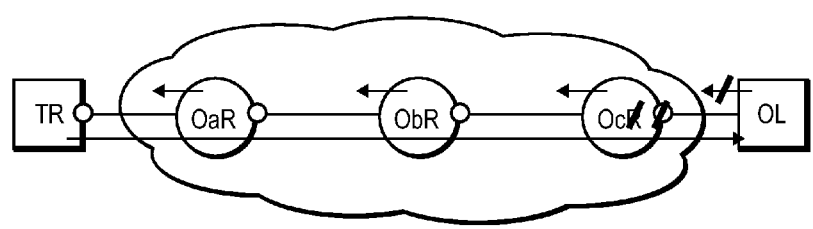

To terminate transmission of a stream, either the Talker or Listener may withdraw registration of the stream. For instance, with reference to FIG. 9A, to "tear down" a queue chain (i.e., to clear the registrations associated to the stream from any queues having allocated resources for the stream), if the Talker is finished, it stops sending data for the stream, and then it can withdraw the offering Talker declaration. As the offering registrations disappear, the ready registrations are propagated in the asking state, instead. When the offering registration is removed from the Listener, the Listener withdraws its ready registration, and all the registrations disappear. Conversely, with reference to FIG. 9B, if the Listener finishes first, e.g., before the stream ends, the Listener may withdraw its ready declaration. In this situation, each bridge, in turn, may i) disallow the stream from leaving the bridge port on which it used to flow; ii) remove the stream from the port configuration; and iii) adjust all registrations according to the new situation. If and when the ready registration is removed from the Talker, the Talker may cease transmission of the stream (that is, if no other Listeners are still listening— the stream reservation is not in either the ready or ready-failed state).

Those skilled in the art may appreciate that MSRP and RSVP (IETF RFCs 2205, 2750) are similar, where the MSRP Talker declaration is very similar to the RSVP (IETF RFCs 2205, 2750) "Path" message, and that the MSRP Listener declaration is very similar to the RSVP "Resv" message. This is intentional. RSVP is familiar to many network administrators and equipment developers, and the basic information flow that it supplies to routers in Layer-3 solves a problem similar to what MSRP solves. As noted above, however, RSVP operates at Layer-3 among routers, and uses individual PDUs (protocol data units) with requests and responses, and individual timers for each stream. MSRP, on the other hand operates at Layer-2 among bridges/switches, and uses the MRP mechanism to group registrations, and minimize timers and responses. In addition, MSRP adds facilities for notifying Talkers and Listeners of the success or failure of the reservations, and for grouping streams that cannot be differentiated by bridges' data forwarding mechanisms. That is, because MRP/MPRP registrations comprise stateful information, MSRP does not use message requests or replies (particularly for each individual stream), as in RSVP.

At the same time, while MSRP and RSVP are different protocols for different layers of operation, MSRP and RSVP may coexist and cooperate within the network, accordingly. For instance, in situations where MSRP and RSVP are used together, a Listener may send an IGMP message or an MMRP or MSRP asking declaration to prompt the Talker to transmit a stream. In response, the Talker may send both an RSVP Path message and an MSRP Talker offering declaration (Talker registration 300b in an offering state). Upon receipt, the Listener may then send the RSVP Resv message for a specific bandwidth to be reserved at Layer-3 routers, and may also send the MSRP Listener ready declaration (Listener registration in the ready state) to initiate queue configuration among any Layer-2 bridges. Once both of these messages are received, the Talker may start transmitting the stream via the Layer-2 bridges and Layer-3 routers, accordingly.

Notably, this illustrative interoperation between MSRP and RSVP is different from conventional RSVP messages in Layer-2, where in the event an RSVP Path message encounters a device known to interconnect with bridges, Layer-2 data is added to the message and the message is transmitted hop-by-hop along the bridges (and reverse for the Resv message). This method, however, is slow to converge on Layer-2, since if there is a topology change within the bridged network, all reservations based on RSVP are wrong until a new Path message is sent. Contrary to this, MSRP offers a unique Layer-2 stream reservation protocol, where MRP (MPRP) may be used to support all registrations traversing the bridged network (e.g., many registrations in one packet, thus much less data/traffic need be transmitted than RSVP). Also, in the event of a Layer-2 topology change, MPRP may very quickly adapt (e.g., particularly where the change is in the middle of a stream path). Those skilled in the art, then, may appreciate that RSVP's end-to-end nature is inefficient in a Layer-2 bridged network.

In accordance with the stream reservation protocol (e.g., MSRP) described above, each of the devices of the bridged network, e.g., stations (Talkers and Listeners) and intermediate bridges, may be configured to operate according to execution of a corresponding process 244 to perform the novel techniques.

For instance, when shared media is disallowed (i.e., non-shared media is used) when granting/denying requests, as described above a Listener station may wait for a Talker declaration to learn of the availability and characteristics of a particular stream S (e.g., bandwidth, priority, etc.). Also, the Listener station may send an asking type Listener declaration (e.g., bandwidth=0) to indicate its desire to receive a stream, and to solicit a Talker registration. When ready to receive a stream, the Listener sends a ready type Listener declaration (e.g., bandwidth≠0) specifying the bandwidth the Listener is ready to receive, and when unable to receive the stream, at least for the moment, may send an asking-failed type Listener declaration (e.g., bandwidth=0) or it may withdraw its Listener registration. Talker declarations may be registered by the Listener to know whether or not the stream reservation has succeeded.

A Talker station, on the other hand, may be configured to wait for a Listener declaration to learn that some Listener wants a stream, and when ready to send the stream, may send an offering type Talker registration (e.g., bandwidth≠0) to request the allocation of bridge resources. Also, a Talker station illustratively registers all Listener declarations for at least the streams the Talker is declaring, and need not transmit any stream's data for which there is no ready or ready-failed Listener registration, or send at a rate greater than the minimum of either the Talker's bandwidth for the stream or the Listener's receivable bandwidth for that registration. (That is, the Talker station may choose to send nothing for any stream where the Talker's registered bandwidth is greater than the receivable bandwidth, or for any stream with an active-failed or ready-failed type Listener registration.)

In addition, a Talker station's list of sendable streams on port P (a "stream list") comprises all streams that the Talker's higher-layer protocols want to send on port P (e.g., a Talker station generally has no unsendable streams). Further, a bridge's list of sendable streams on port P comprises all offering Talker registrations on all ports other than P, as well as multiple Talker registrations for the same stream ID, which are considered to be a single registration, using the maximum of the Listener registrations' bandwidths values, and the best rank R. Note that the list of sendable streams on port P may be sorted by the 2-tuple, {rank, talker ID}, from the most important (lowest integer value) to the least important (highest integer value).

The sendable streams (stream list) are examined/modified, output port by output port, based on stream collisions. If multiple offering registrations in the sendable streams list have the same VLAN ID and MAC address for their stream ID 322, and if the MAC Only parameter 334 is set in any of those registrations, and if the processing bridge is unable, on port P, to make an independent decision as to whether to output each of those streams on this port, then those streams form a "collision group." The streams of the collision group are considered as a single entry in the sendable streams list, ordered by the highest-ranking stream in the collision group. As such, a stream that does not collide with any other stream is considered a one-stream collision group.

When propagating Talker registrations via intermediate bridges, the collision groups are examined in order, from highest- to lowest-ranked, and the queue configuration for port P is built, starting from a basis of no reserved streams. If not all of the streams in the collision group can be added successfully to the queue configuration built so far, a failed declaration may be sent for each of the streams on port P, and the streams may all be disabled for transmission on this port. (These are the streams that cannot be sent, if the quality of service (QoS) guarantees are to be met.) Otherwise, if there is an asking-failed Listener registration on port P for every one of the streams in the collision group, a failed declaration may be sent for each stream in the group, and all may be disabled for transmission. Accordingly, this tells the receiver that the data for this collision group will not be sent from this port, so that the receiver can release any resources assigned to the collision group's streams. If, on the other hand, there is a ready or ready-failed Listener registration on port P for any stream in the collision group, then an offering declaration may be sent for each of the streams in the collision group, and all of the streams in the collision group may be added to the queue configuration, and all may be enabled for transmission. (These are the streams that are to be configured on port P.) Otherwise, an offering declaration may be sent for each of the streams in the collision group, but the streams may not be added to the queue configuration, and they may all be disabled for transmission. (These are the streams that could be configured on port P, should a receiver on port P indicate its readiness to receive the stream.) Note that when computing the bandwidth of a stream, a bridge uses the maximum of the Talker's bandwidth, from the Talker registration, and the Listener's bandwidth, from the matching Listener registration (if present).

Conversely, when propagating Listener registrations via intermediate bridges, to decide what Listener declarations to issue from port P, the bridge constructs a list of all Listener registrations all ports other than P. Registrations for the same stream ID S may be combined into a single entry. In particular, for this single entry, the resultant Listener receivable bandwidth is the minimum of all non-zero Listener bandwidth values, or zero if all are zero. Also, the propagated declaration type for the single entry is either asking-failed or ready-failed if any of the other ports' registrations are asking-failed or ready-failed, and it is asking or ready if all other ports' registrations are asking or ready. Also, the propagated declaration type for the single entry is either ready or ready-failed if any of the other ports' registrations are ready or ready-failed, and it is asking or asking-failed, if all other ports' registrations are asking or asking-failed.

Notably, when shared media is allowed in a bridged network, certain provisions may be illustratively configured on the devices to operate accordingly. In particular, as difference to non-shared media operations above, a Talker station registers all Talker and Listener declarations, and does not transmit any stream's data for which there is no ready or ready-failed Listener registration, or send at a rate greater than the minimum of the Talker's bandwidth or any of the Listener's bandwidths.

In addition, for shared media networks, a bridge or Talker may illustratively construct a "media stream list" (not shown) on each port P, comprising all collision groups that a Talker's higher-layer protocols want to send on port P, and all offering Talker registrations for collision groups on all ports. Every collision group on the list that has no asking, ready, or ready-failed Listener registrations on port P that matches any of streams' stream ID S, is removed from the media stream list. The remaining collision groups in the media stream list on port P may be sorted by the 2-tuple, {rank, talker ID}, from the most important (lowest integer value) to the least important (highest integer value). (Duplicates may be eliminated, using the higher of their Talker bandwidth values, and most important rank R.)

Further, for every shared medium port P, the collision groups in the media stream list are examined in order, from most- to least-important, and a "media load configuration" for the media to which port P is attached is constructed, starting from a basis of no configured streams. For instance, if the medium cannot accommodate the collision group, its streams may all be deleted from the list, and these streams are to be removed from the medium, if the quality of service (QoS) guarantees are to be met. Otherwise, if there is a ready or ready-failed Listener registration on port P for any stream in the collision group, all streams in the group may be added to the media load configuration, and these streams are to be carried on the medium. When propagating the Talker Registrations, then, an intermediate bridge with shared media may add (or not add) streams to both the queue configuration and (or nor) to the media load configuration.

Figures 10A, 10B:
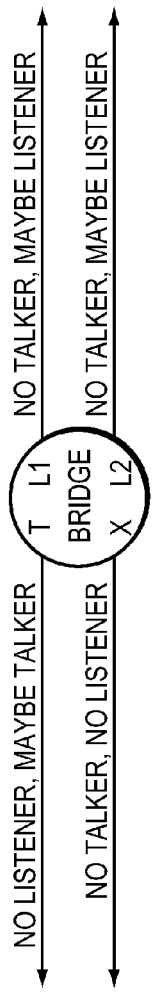

The following charts/tables referring to FIGS. 10A-10G illustrate registration propagation scenarios (possibilities) and the resultant outcomes (e.g., based on non-shared media). For instance, an intermediate bridge may register Talkers or Listeners with various states on a particular port, and may thus respond on (generally) the other ports of the bridge with a corresponding declaration. The following charts/tables thus demonstrate an illustrative embodiment of registration propagation in accordance with one or more of the techniques described above. In particular, as shown in FIG. 10A, an alternative view of an example single bridge (e.g., an AV bridge) having four ports may be used with reference to the discussion regarding the tables below in FIGS. 10C-10G. In particular, a port T may or may not have a Talker registration for stream S, but has no Listener registration. Ports L1 and L2 may or may not each have a Listener registration for stream S, but have no Talker registrations. Also, port X has neither a Talker nor a Listener registration for stream S. Further, in FIG. 10B, an illustrative symbol key is shown for reference to FIGS. 10C-10G (notably, the zero-bandwidth ready declaration is not included in these tables).

FIG. 10C illustrates an example table formed in accordance with propagating Listener registrations in the absence of any Talker registration from port T (e.g., "asking" declarations). Normally, no ready, ready-failed, or asking-failed declarations should be received in this case ("N" in the top row), but this can happen briefly when registrations are changing. For example, in a first column, there are no registrations, and thus, there are no declarations to any ports. However, in the second column, a Listener registers on port L2 with an asking state registration, and in response, the asking registration is declared on each port other than L2. Other combinations and appropriate responses in accordance with the techniques described herein may be read from the table in FIG. 10C, accordingly.

Figure 10D:
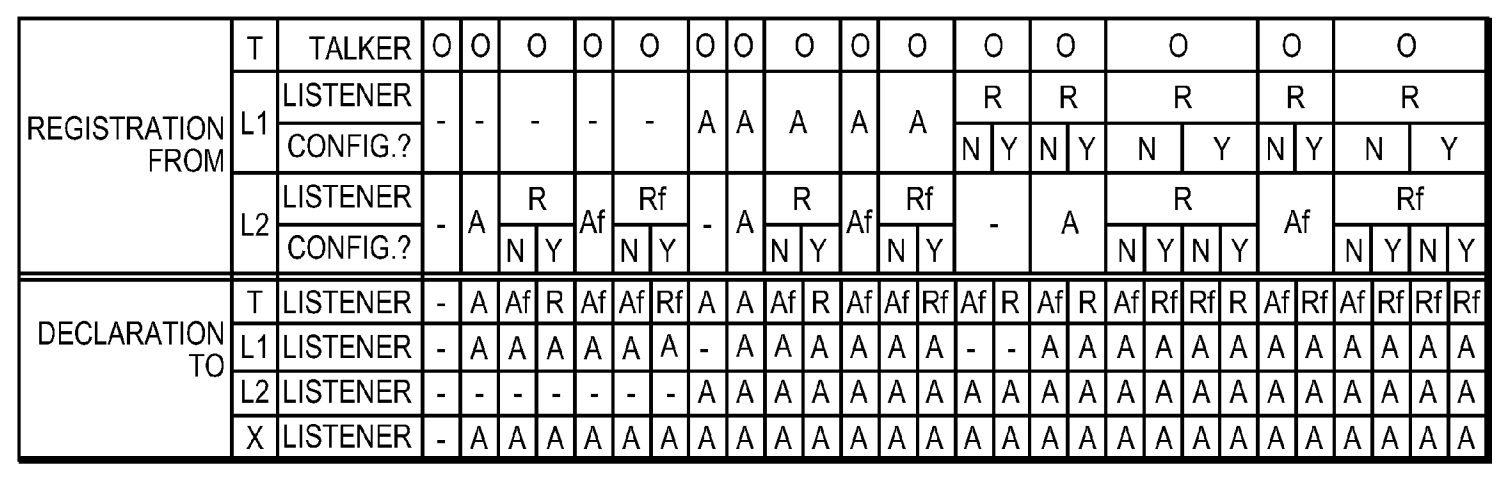

FIGS. 10D and 10E illustrate a table (split into two figures) formed in accordance with propagating Listener registrations in the presence of an offering Talker registration from port T. (That is, FIG. 10D illustrates a first set of scenarios, while FIG. 10E continues the possible scenarios from where FIG. 10D left off, column-wise.) In particular, "config.?" indicates whether or not the port from which a registration is received has been configured for the stream (e.g., whether resources may be allocated to the stream on that port). Notably, as can be deduced from the table in FIGS. 10D and 10E, if at least one listener is ready for a stream, an R (ready state, all listeners can receive stream) or Rf (ready-failed state, some listeners can receive stream) is propagated, and if not, an A (asking state, some listeners want stream). Also, if there is a failed path, an Af (asking-failed state, no listeners can receive stream) is propagated.

Figure 10F:
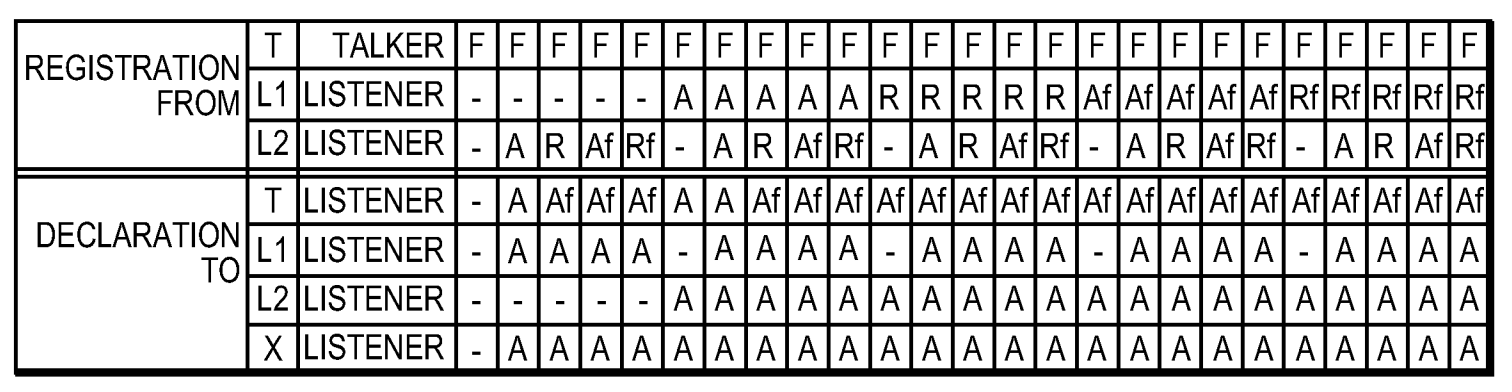

In the presence of a failed Talker registration from port T, however, FIG. 10F illustrates another example table that may be populated based on scenarios and outcomes as described above for this particular scenario. For instance, if there is a failed path received on any listener port, an asking-failure (Af) declaration may be propagated on port T, otherwise, the Asking state listener registration may still be sent on the port T.

On the other hand, FIG. 10G illustrates an example table populated in response to propagation of Talker registrations in accordance with the techniques described above. For instance, the second row of the table is an input to the table, and is the result of the Listener registration propagated to port T from the previous tables. The next (third) row is the registration received from port L. (Note that the "Sufficient BW" answer is the result of the Talker propagation computation.) In this manner, it can be seen that the techniques described herein need only propagate the registration as failed if it is not possible that any device on a port receive the stream. Otherwise, a failure is not appropriate.

Figure 11:
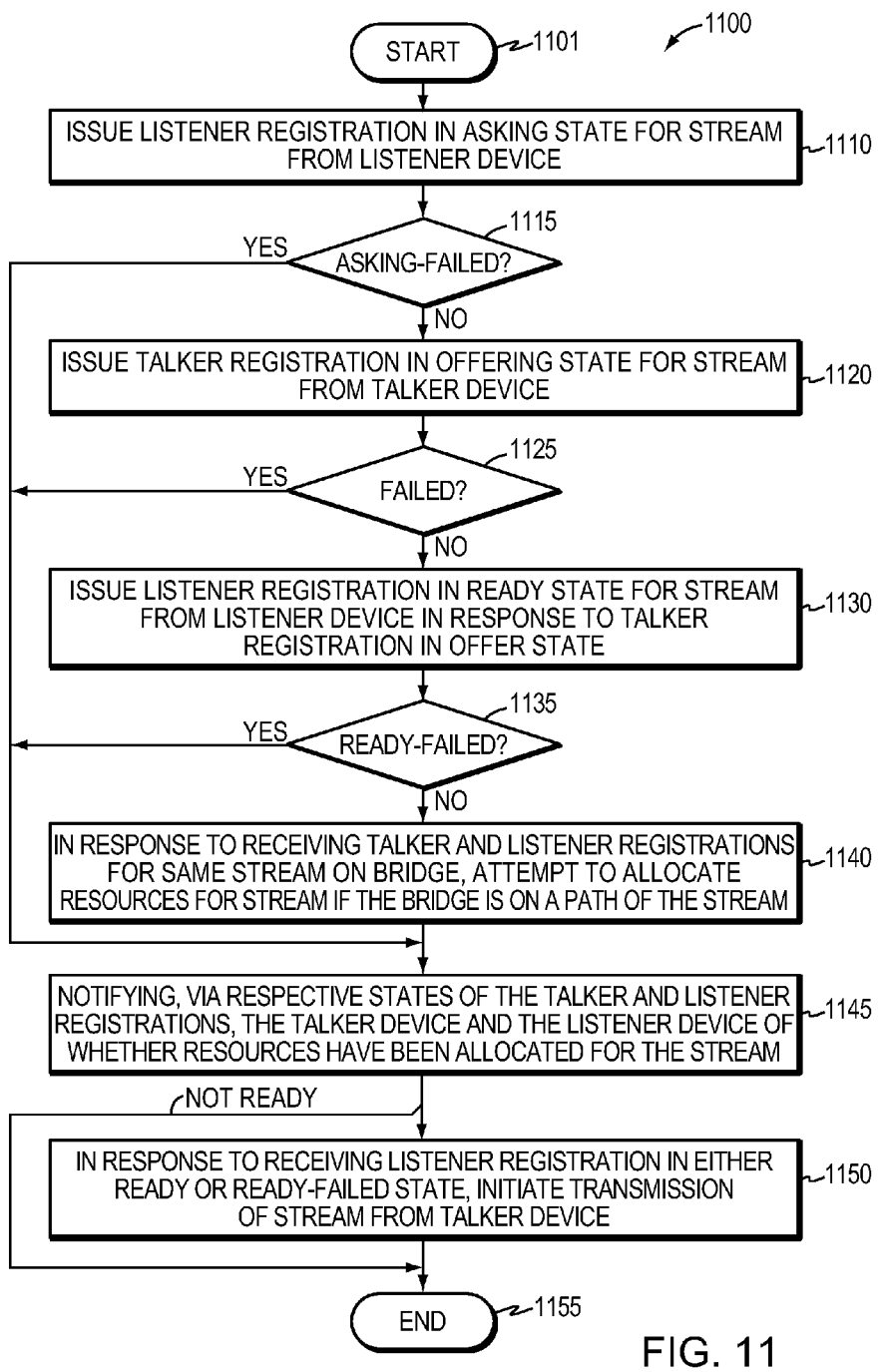
FIGS. 11 and 12 illustrate (correspondingly) an example procedure for managing stream reservations in a bridged network.
Figure 12:
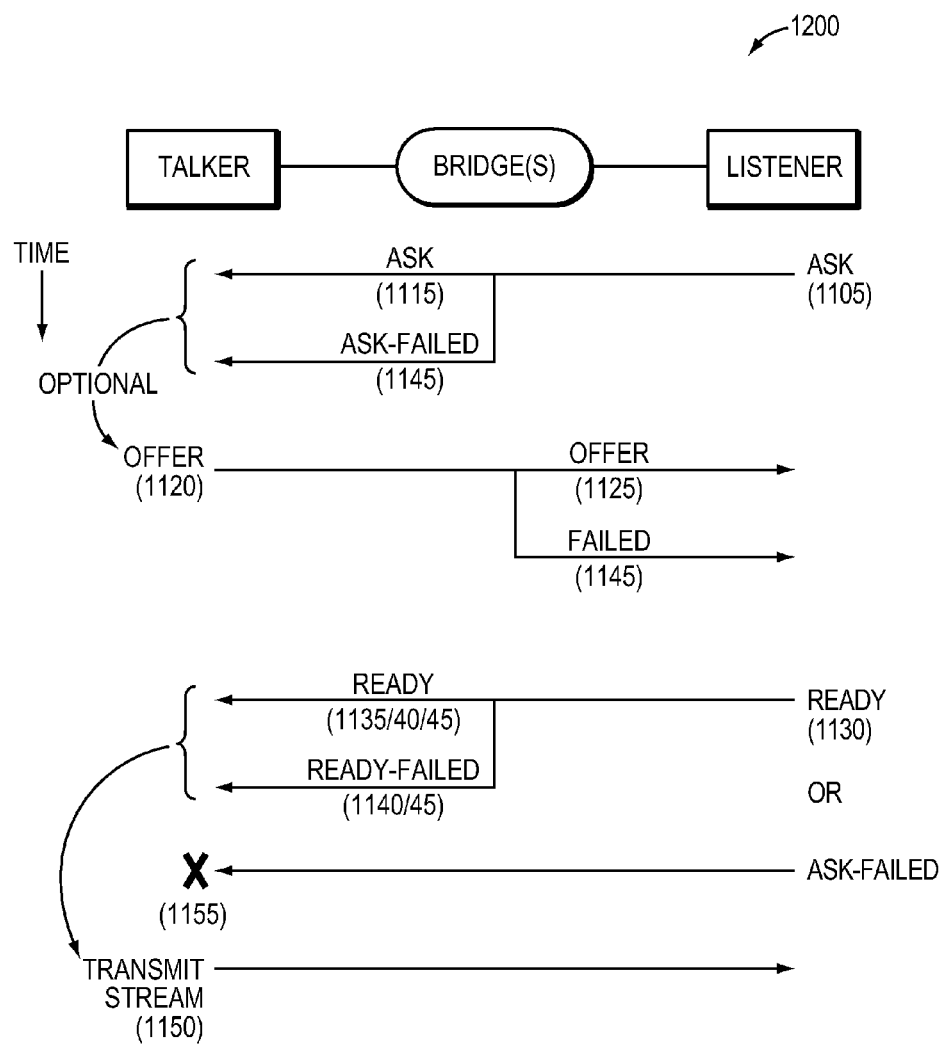

According to the techniques described above, therefore, FIG. 11 illustrates a simplified example procedure for managing allocation of resources for streams in accordance with one or more embodiments described herein. In addition, FIG. 12 briefly illustrates a simplified timing example diagram 1200 that may be read in conjunction with FIG. 11.

The procedure 1100 starts at step 1105, and continues to step 1110, where, optionally, a listener device (e.g., L) issues a listener registration 300a in asking state for a particular stream, that is, "asks" to receive the stream. If the asking state need not be changed to asking-failed in step 1115 by any intermediate bridge (as described above), or if step 1110 is not performed, then in step 1120 a talker device (e.g., T) issues a talker registration 300b in offering state for a particular stream (e.g., the stream asked for in step 1110).

If in step 1125 the offering state remains unchanged by any intermediate bridge (again, as described above), then in step 1130 the receiving listener devices that wish to receive the stream (and that are able to receive the stream) may reply by issuing a listener registration 300a in ready state for the stream. (Notably, as mentioned above, steps 1120 and 1130 may be interchanged in order, as they are neither is dependent on each other aside from this illustrative example of responsive listener registrations; that is, other triggers may cause each of the talker and listener registrations to be sent independently of one another.)

Further, if the ready state does not need to be changed to ready-failed in step 1135 by any intermediate bridge (described above), then in step 1140, in response to receiving talker and listener registrations for the same stream, an intermediate bridge may attempt to allocate resources for stream (e.g., the bandwidth requested in the registration) if the bridge is on a path of the stream. The intermediate bridge may then notify the talker device and the listener device, via respective states of the talker and listener registrations accordingly (and as described in more detail above), whether resources have been allocated for the stream in step 1145 (i.e., or whether from steps 1115, 1125, or 1135 the registrations have otherwise failed).

Depending on whether the notification is a failure or a success (at least partially), then the procedure 1100 may continue to step 1150 (success) where the talker device may initiate transmission of the stream in response to receiving the listener registration in either the ready or read-failed state. Then, or alternatively (failure), the procedure ends in step 1155. (Note that MSRP may use one or more timers, such as to determine when to refresh all registrations again, accordingly.)

Advantageously, the novel techniques described herein manage allocation of resources for streams in a bridged computer network. By providing layer-2 resource allocation mechanisms, the novel techniques allow for bandwidth reservation for specific flows/streams across a bridged network. In particular, the techniques described above operate on shared media as well as for multiple streams to a single destination address. In addition, the techniques above are more robust and send fewer packets than current solutions, such as RSVP for layer-3. Further, the dynamic aspects of one or more embodiments described herein alleviate the need for cumbersome and inefficient manual configuration.

Also, other techniques that attempt to provide the services and feature set described above are either broken, less robust, and/or more wasteful of bandwidth, and often do not notify the Talker that the bridges and the Listener have configured their queuing mechanisms so as to be ready to carry and absorb the data stream; i.e., the Talker does not know when it is OK to start sending the data stream. This lack of feedback makes it impossible, for example, to support multiple separate flows to the same destination address, which is a serious drawback for traffic bridged from router to router. Building the trail of configured queues from the Talker to the Listener also causes unnecessary flapping when a new, important, stream fails to find sufficient bandwidth to reach its destinations.

While there have been shown and described illustrative embodiments that manage allocation of resources for streams in a bridged computer network, it is to be understood that various other adaptations and modifications may be made within the spirit and scope of the present invention. The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method comprising:
issuing a Talker declaration for a layer 2 stream from a Talker device to one or more layer 2 bridges and one or more Listener devices in a network domain, the Talker declaration having a declaration type that advertises the Talker device is offering the layer 2 stream, and including a stream identifier (ID) that uniquely identifies the layer 2 stream, an indication of network bandwidth requirements of the layer 2 stream, and an indication of a priority of data frames belonging to the layer 2 stream, wherein the one or more layer 2 bridges do not include layer 3 functionality;
receiving a Listener declaration at the Talker device from a Listener device of the one or more Listener devices, the Listener declaration including a same stream ID as the Talker declaration and having a declaration type that indicates at least one Listener device is ready to receive the layer 2 stream and that sufficient network bandwidth to meet the network bandwidth requirements of the stream has been allocated, based on at least one of the Listener declaration and the Talker declaration, by one or more intervening layer 2 bridges that received both the Talker declaration and the Listener declaration that include the same stream ID; and
in response to receiving the Listener declaration at the Talker device, beginning transmission of the layer 2 stream from the Talker device to the Listener device via the one or more intervening layer 2 bridges.

2. The method of claim 1, wherein the Listener declaration's declaration type is a ready type that indicates each of the Listener devices can receive the layer 2 stream.

3. The method of claim 1, wherein the Listener declaration's declaration type is a ready-failed type that indicates at least one Listener device can receive the layer 2 stream and at least one Listener device cannot receive the layer 2 stream.

4. The method of claim 1, wherein the Talker declaration's declaration type is a type that indicates the Talker device is ready to send the layer 2 stream upon a Listener declaration having a ready or a ready-failed declaration type.

5. The method of claim 1, further comprising:
responding, by the Listener device of the one or more Listener devices, to the Talker declaration with the Listener declaration, wherein the Listener declaration's declaration type is a ready type.

6. The method of claim 5, further comprising:
determining, at one of the one or more layer 2 bridges that is along the path of the layer 2 stream, that at least one other Listener device of the one or more Listener devices is unable to receive the layer 2 stream; and
changing the declaration type of the Listener declaration from the ready type to a ready-failed type.

7. The method of claim 1, wherein the stream ID includes a media access control (MAC) address combined with one or more other values.

8. The method of the claim 1, wherein the Talker declaration further includes an indication of a rank used in resolving competition for bandwidth.

9. The method of claim 1, wherein the Listener declaration includes an indication of bandwidth a Listener device of the one or more Listener devices is prepared to receive for the layer 2 stream.

10. The method of claim 1, wherein the Talker device comprises one or more processors interconnected to a memory by a bus.

11. An apparatus comprising:
a network interface configured to send and receive packets;
a processor coupled to the network interface and configured to execute one or more processes; and
a memory configured to store a talker process, the talker process when executed operable to:
issue a Talker declaration for a layer 2 stream via the network interface to one or more layer 2 bridges that do not include layer 3 functionality, the Talker declaration having a declaration type that advertises the Talker device is offering the layer 2 stream, and including a stream identifier (ID) that uniquely identifies the layer 2 stream, an indication of bandwidth requirements of the layer 2 stream, and an indication of a priority of data frames belonging to the layer 2 stream,
process a Listener Declaration received via the network interface from a Listener device of one or more Listener devices, the Listener declaration including a same stream ID as the Talker declaration and having a declaration type that indicates at least one Listener device is ready to receive the layer 2 stream and that sufficient bandwidth to meet the resource requirements of the layer 2 stream has been allocated, based on at least one of the Listener declaration and the Talker declaration, by one or more intervening layer 2 bridges that received both the Talker declaration and the Listener declaration that include the same stream ID, and
in response to the Listener declaration received from the Listener device, begin transmission of the layer 2 stream to the Listener device via the one or more intervening layer 2 bridges.

12. The apparatus of claim 11, wherein the Listener declaration's declaration type is a ready type that indicates each of the Listener devices can receive the layer 2 stream.

13. The apparatus of claim 11, wherein the Listener declaration's declaration type is a ready-failed type that indicates at least one Listener device can receive the layer 2 stream and at least one Listener device cannot receive the layer 2 stream.

14. The apparatus of claim 11, wherein the Talker declaration's declaration type is a type that indicates the apparatus is ready to send the layer 2 stream upon a Listener declaration having a ready or a ready-failed declaration type.

15. The apparatus of claim 11, wherein the stream ID includes a media access control (MAC) address combined with one or more other values.

16. The apparatus of claim 11, wherein the Talker declaration further includes an indication of a rank used in resolving competition for bandwidth.

17. The apparatus of claim 11, wherein the Listener declaration includes an indication of bandwidth a Listener device of the one or more Listener devices is prepared to receive for the layer 2 stream.

18. A non-transitory computer-readable storage medium having stored therein instructions which, when executed by a processor, cause the processor to perform operations comprising:
issuing a Talker declaration for a layer 2 stream from the Talker device to one or more layer 2 bridges and one or more Listener devices in a network domain, the Talker declaration having a declaration type that advertises the Talker device is offering the layer 2 stream, and including a stream identifier (ID) that uniquely identifies the layer 2 stream, an indication of bandwidth requirements of the layer 2 stream, and an indication of a priority of data frames belonging to the layer 2 stream, wherein the one or more layer 2 bridges do not include layer 3 functionality;
processing a Listener declaration received at the Talker device from a Listener device of the one or more Listener devices, the Listener declaration including a same stream ID as the Talker declaration and having a declaration type that indicates at least one Listener device is ready to receive the layer 2 stream and that sufficient bandwidth to meet the bandwidth requirements of the layer 2 stream have been allocated, based on at least one of the Listener declaration and the Talker declaration, by one or more intervening layer 2 bridges that received both the Talker declaration and the Listener declaration that include the same stream ID; and
in response to the received Listener declaration, initiating a transmission of the layer 2 stream from the Talker device to the Listener device via the one or more intervening layer 2 bridges.

19. The non-transitory computer-readable storage medium of claim 18, wherein the Listener declaration's declaration type is a ready type that indicates each of the Listener devices can receive the layer 2 stream.

20. The non-transitory computer-readable storage medium of claim 18, wherein the Listener declaration's declaration type is a ready-failed type that indicates at least one Listener device can receive the layer 2 stream and at least one Listener device cannot receive the layer 2 stream.

21. A method comprising:
issuing a Talker declaration for a layer 2 stream from a Talker device in a layer 2 network to one or more layer 2 bridges that do not include layer 3 functionality, the Talker declaration having a declaration type that advertises the Talker device is offering the layer 2 stream, and including a stream identifier (ID) that uniquely identifies the layer 2 stream;
receiving a Listener declaration at the Talker device, the Listener declaration including the same stream ID as the Talker declaration, and having a declaration type that indicates at least one Listener device is ready to receive the layer 2 stream and that sufficient bandwidth to meet bandwidth requirements of the layer 2 stream are available at one or more intervening layer 2 devices that received both the Talker declaration and the Listener declaration, wherein the layer 2 stream is allocated based on at least one of the Listener declaration and the Talker declaration; and
beginning transmission of the layer 2 stream from the Talker device to the at least one Listener device via the one or more intervening layer 2 devices.

22. The method of claim 21, wherein the Listener declaration's declaration type is a ready type that indicates each of a set of Listener devices can receive the layer 2 stream.

23. The method of claim 21, wherein the Listener declaration's declaration type is a ready-failed type that indicates at least one Listener device of a set of Listener devices can receive the layer 2 stream and at least one Listener device of the set of Listener devices cannot receive the layer 2 stream.

24. The method of claim 21, wherein the Talker declaration includes an indication of bandwidth of the layer 2 stream, and the Listener declaration includes an indication of bandwidth the at least one Listener device is prepared to receive.

25. An apparatus comprising:
a network interface configured to send and receive packets;
a processor coupled to the network interface and configured to execute one or more processes; and
a memory configured to store a talker process, the talker process when executed operable to:
issue a Talker declaration for a layer 2 stream via the network interface to one or more layer 2 bridges that do not include layer 3 functionality, the Talker declaration having a declaration type that advertises the Talker device is offering the layer 2 stream, and including a stream identifier (ID) that uniquely identifies the layer 2 stream,
process a Listener declaration received via the network interface, the Listener declaration including the same stream ID as the Talker declaration, and having a declaration type that indicates at least one Listener device is ready to receive the layer 2 stream and that sufficient bandwidth to meet bandwidth requirements of the layer 2 stream are available at one or more intervening layer 2 devices that received both the Talker declaration and the Listener declaration, wherein the layer 2 stream is allocated based on at least one of the Listener declaration and the Talker declaration, and
begin transmission of the layer 2 stream from the Talker device to the at least one Listener device via the one or more intervening layer 2 devices.

26. The apparatus of claim 25, wherein the Listener declaration's declaration type is a ready type that indicates each of a set of Listener devices can receive the layer 2 stream.

27. The apparatus of claim 25, wherein the Listener declaration's declaration type is a ready-failed type that indicates at least one Listener device of a set of Listener devices can receive the layer 2 stream and at least one Listener device of the set of Listener devices cannot receive the layer 2 stream.

28. The apparatus of claim 25, wherein the Talker declaration includes an indication of bandwidth of the layer 2 stream, and the Listener declaration includes an indication of bandwidth the at least one Listener device is prepared to receive.

* * * * *